US005720455A

United States Patent [19]
Kull et al.

[11] Patent Number: 5,720,455
[45] Date of Patent: Feb. 24, 1998

[54] INTRA-TRAIN RADIO COMMUNICATION SYSTEM

[75] Inventors: Robert C. Kull, Olney; Richard S. Klemanski, Walkersville, both of Md.

[73] Assignee: Westinghouse Air Brake Company, Wilmerding, Pa.

[21] Appl. No.: 747,833

[22] Filed: Nov. 13, 1996

[51] Int. Cl.$^6$ ................................................. B60L 23/00
[52] U.S. Cl. ........................................ 246/187 C; 340/902
[58] Field of Search ........................... 246/166.1, 167 R, 246/169 R, 187 C; 340/900, 902

[56] References Cited

U.S. PATENT DOCUMENTS

| | | | |
|---|---|---|---|
| 3,696,758 | 10/1972 | Godinez, Jr. | 246/187 C |
| 4,344,364 | 8/1982 | Nickles et al. | 246/187 C |
| 4,582,280 | 4/1986 | Nichols et al. | 246/182 R |
| 5,039,038 | 8/1991 | Nichols et al. | 246/187 C |
| 5,570,284 | 10/1996 | Roselli et al. | 246/187 C |

Primary Examiner—S. Joseph Morano
Attorney, Agent, or Firm—Whitham, Curtis, Whitham & McGinn

[57] ABSTRACT

A radio-based system for a train including a lead transceiver unit and multiple remote transceiver units. The lead transceiver unit initiates a command by sending a command message. Each of the remote transceivers receiving the command message transmits a reply message which repeats the command message and contains the status of the sending remote. Remote transceivers not receiving the lead transceiver's transmitted command message, but receiving a reply message from one of the other remote transceivers, transmit a reply message containing the remote's status. The lead transceiver detects whether reply messages are received from the remote transceivers and may transmit a request in response. One or more remote transceivers may store and re-transmit reply messages from other transceivers in response to the request.

40 Claims, 8 Drawing Sheets

INTRA-TRAIN RADIO COMMUNICATION SYSTEM

BACKGROUND OF THE INVENTION

1. Field of the Invention

The present invention generally relates to improvements in railroad telemetry and control systems and, more particularly, to improvements in communications between a lead locomotive and multiple remote units in what is referred to as a Distributed Power Control (DPC) operation and other intra-train communications functions.

2. Background Description

The Federal Communication Commission (FCC) allocates blocks of radio frequencies for railroad communications. The Association of American Railroads (AAR) then further allocates the frequencies on a channel basis, which are then used by radio-based intra-train communications systems. Radio-based intra-train communications must conform to these AAR channel standards. The current AAR standard assigns frequencies on a 25 KHz channel basis within the UHF band. There are currently four such channels. The channels are typically assigned as one channel for each train, and communication within those channels is typically half-duplex. The channels are assigned between different trains on a randomized basis to reduce the probability of interference between different trains. However, in view of there being only four channels, the intra-train communication systems must be able to perform with multiple trains within RF range of one another having the same assigned frequency. Accordingly, there is a need for communication systems that are both resistant to inter-train interference and, because of the limited number and bandwidth of channels, being efficient in the utilization of the available channel. In addition, the communication systems must be flexible to accommodate differing numbers of remote locomotives and other control units arranged within various train consists.

Proposed solutions to the interference problem have appeared in the related art. For example, a protocol described in U.S. Pat. No. 4,582,280, issued to Nichols et al., ("Nichols '280") includes a sequential channel establishment and termination protocol, or linking procedure, and subsequent identifier protocol for communications between the lead station and remote stations. The linking procedure described in the Nichols '280 patent, although reducing the chance for a false communication, does not fully address channel management after the linking procedure is complete. In addition, the Nichol's '280 patent discloses repeating or retransmission of commands by certain ones of the remote units in a manner by which the retransmission occupies an additional message slot, thereby, in some circumstances, reducing channel efficiency.

SUMMARY OF THE INVENTION

It is therefore an object of the present invention to provide an intra-train radio communication system which is both highly reliable and provides efficient channel management.

It is another object of the invention to provide an intra-train radio communication protocol which eliminates the overhead of multiple broadcasts.

The present invention provides a Distributed Power Control (DPC) communication system having a a plurality of communication modules, each communication module being mounted in a respective one of a plurality of locomotives in a train consist. The communication modules include redundant radio transmitters and receivers, a control module connected to and controlling the radio transmitters and receivers, a user interface connected to the control module for inputting data and commands by a user and outputting information to the user, and a hardware interface connected to the control module for receiving inputs from and outputting commands to a locomotive in which the communication module is mounted. One of the communications modules is designated as a lead unit and others of the plurality of communications modules are designated as remote units. The lead unit and the remote units are linked by a Carrier Sense Multiple Access (CSMA) radio channel. The lead unit and the remote units store a unique identifier for the lead unit, and the lead unit also stores unique identifiers for each of the remote units. Each of the remote units store the unique identifier for the respective remote unit, and the lead and remote units store an index indicating a position of the unit in the train consist.

Communication from the lead unit to the remote units is effected by the lead unit sending a command message having a source field, a destination field, and a command field. The source field contains the unique identifier for the particular lead unit. When a remote unit receives the command message, it compares the contents of the source field against its stored lead identifier and compares the contents of the message's destination field against the remote's own identification number. If both of these are matches, the receiving remote unit performs the function encoded in the message's command field. Each of the remote units further includes a reply circuit which, upon performing the command received from the lead unit, transmits a status message back. The status message indicates whether the command has been carried out and/or provides the lead unit with requested information. The status message is transmitted in a predetermined time slot measured from the time the command message is received. The lead unit monitors the predetermined time slots and thereby detects a failure by one or more remote units to reply with a status message. In response to the detected failure, the lead unit generates appropriate commands depending on the particular embodiment of the invention.

At least one of the remote units includes a command message repeater function. The command message repeater function rebroadcasts the command message received from the lead unit. The command message repeater function rebroadcasts the command message and transmits the remote unit's response to that command in the same message. The invention's rebroadcasting the command and sending the reply in the same message eliminates the repeated overhead of two separate transmissions.

In a further embodiment, at least one of the remote units includes a reply message repeater function. The reply message repeater function receives and stores the reply from another remote unit to a lead unit command message. As previously mentioned, the lead unit monitors the predetermined status message time slot corresponding to each of the remote units. The lead unit thereby detects a failure by one or more remote units to reply. One cause for a detected failure is low signal strength of a reply message at the lead unit's receiving antenna, particularly for remote units spaced far from the lead unit. However, the remote unit having the reply message repeater function is positioned at a location where the signal strength from all other remote units is detectable but still in range of the lead unit. When the lead unit detects a missing reply, it first transmits a command message to the remote unit having the reply message repeater function for that unit to repeat the missing reply.

Depending on the particular embodiment, the reply message repeater function responds to such a request by, for example, searching its memory for a reply, which is also termed a status message, from the requested remote unit and, if found, transmitting it. Depending on design choice, the reply message repeater function could either send no message or a message indicating "nothing found" if there is no valid status message from the requested remote resident in its memory.

In a further embodiment of the present invention, the remote units can transmit alarm messages without receiving a command from the lead unit. This is done by first checking the CSMA channel to determine if the channel is clear for a predetermined delay period and then transmitting the alarm message to the lead unit. The lead unit responds by acknowledging the receipt of the alarm message.

BRIEF DESCRIPTION OF THE DRAWINGS

The foregoing and other objects, aspects, and advantages will be better understood from the following detailed description of preferred embodiments of the invention with reference to the drawings, in which.

DETAILED DESCRIPTION OF PREFERRED EMBODIMENTS OF THE INVENTION

Figure 1:
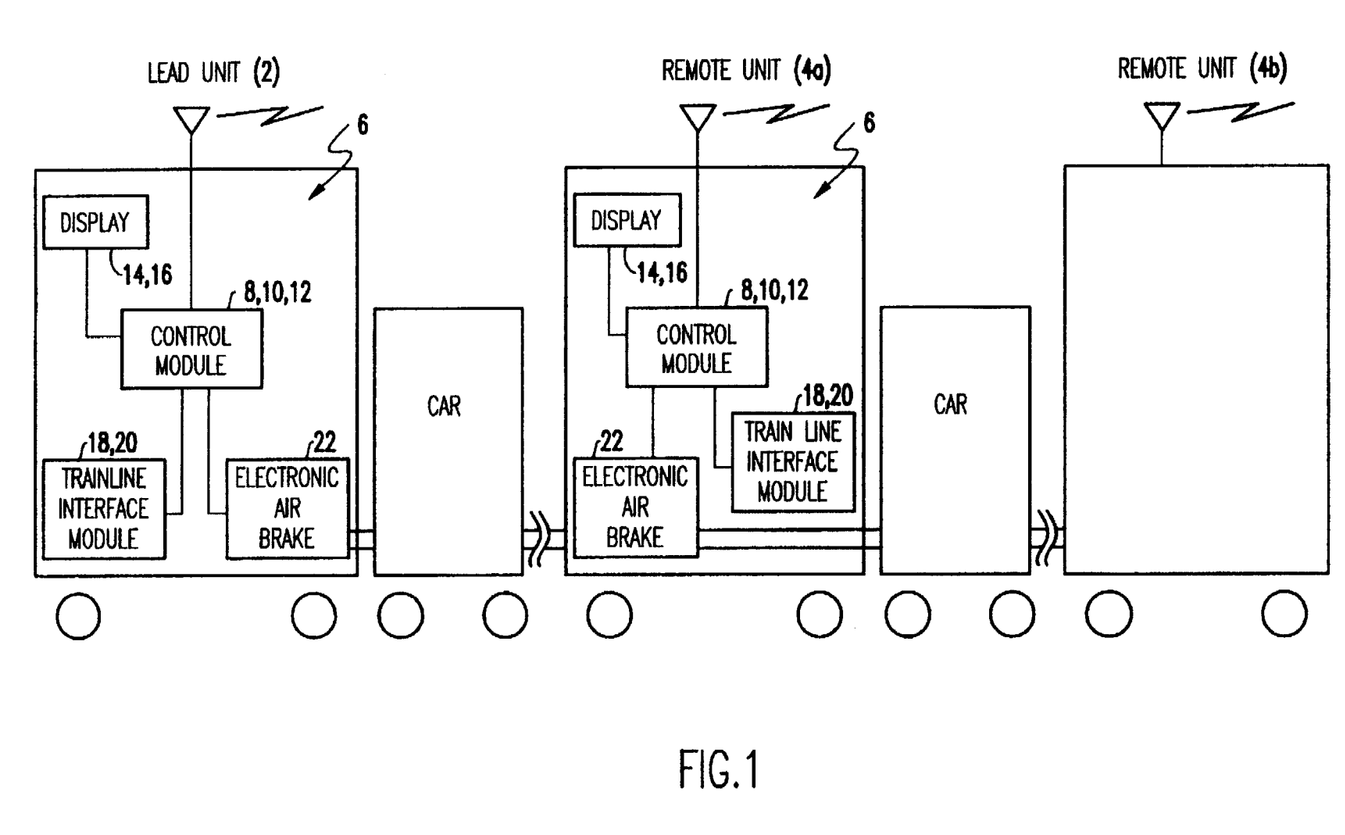
FIG. 1 is a system block diagram of an embodiment of the present invention.
Figure 2:
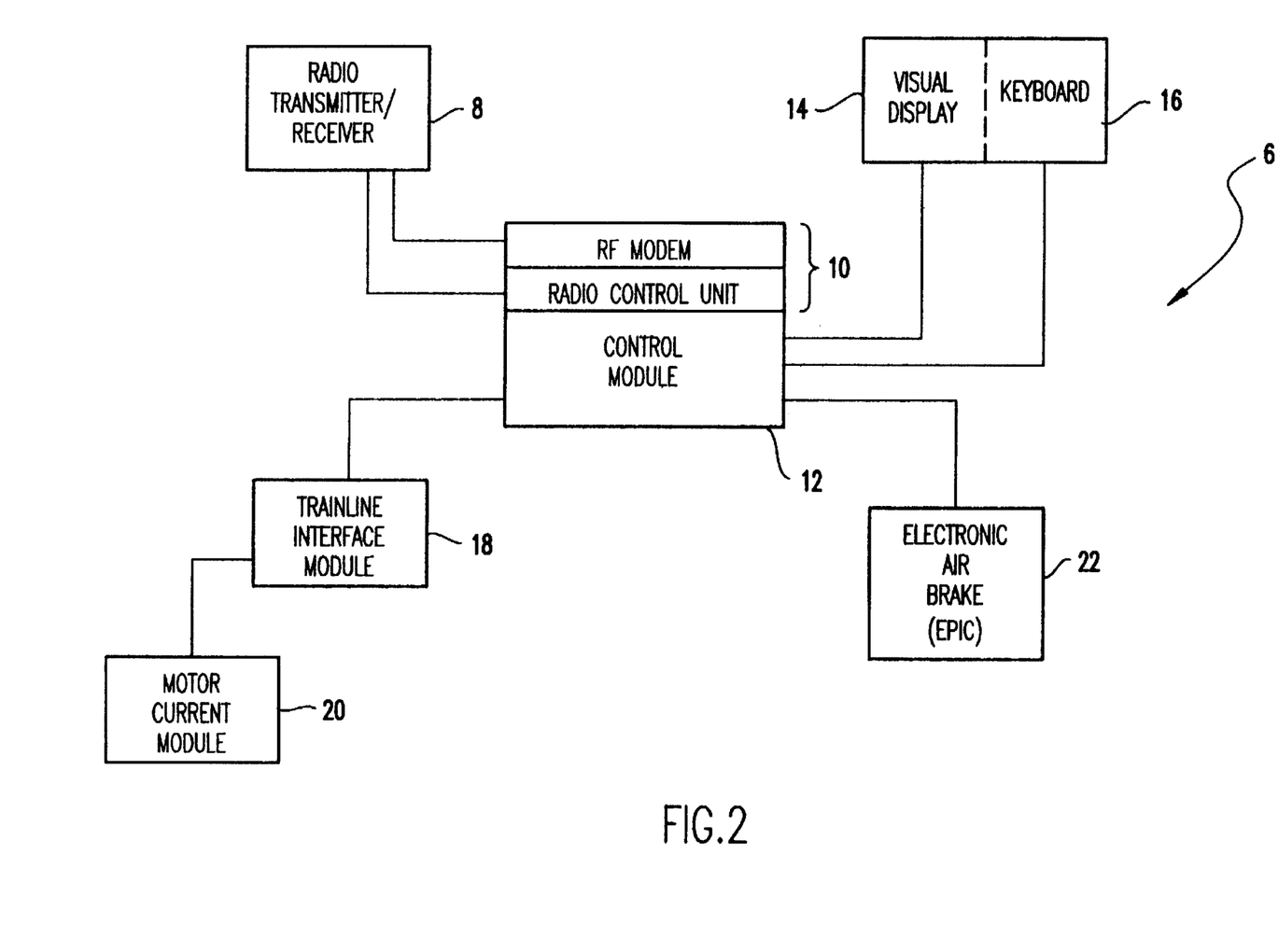
FIG. 2 is a hardware block diagram of a unit which can function as a lead unit or as a remote unit of the system of FIG. 1.

Referring now to the drawings, and more particularly to FIGS. 1 and 2, there is shown an intra-train communication system according to the present invention having a lead unit 2, a remote unit 4a and a remote unit 4b. For this description a generic reference to a remote is by 4x, and a reference to a specific remote is by 4a, 4b ... 4n. The lead unit 2 and the remote units 4a and 4b, for this example embodiment, are identical hardware units, shown as hardware unit 6 in FIG. 2. As shown in FIG. 1, the lead unit 2 is in one of the locomotives designated as the lead locomotive, and each the remote units 4a and 4b are in remote locomotives. As explained further below, hardware unit 6 has the capability to operate as a lead unit 2 or a remote unit 4x by its prestoring and then selecting from in accordance with user commands, a plurality of software programs for a plurality of modes, including that of a lead unit 2 and a remote unit 4x. The hardware unit 6 is configured into a lead unit 2 or a remote unit 4x by a simple software selection command executed at some initialization point.

Referring to FIG. 2, each hardware unit 6 comprises a redundant radio transmitter and receiver 8, an RF modem and radio control unit 10, a microprocessor-based control module 12, a visual display 14, a keyboard or equivalent operator data entry apparatus 16, a trainline interface module 18, a motor current module 20, and an electronic air brake system (EPIC) 22. The redundant radio transmitter and receiver 8 comprises two identical transmitters and two identical receivers (or transceivers). The receivers (or receiver sections) are always on when the system is in operation, but only one of the transmitters (or transmitter section) is on at a time. As will be explained more fully below, the transmitters may be toggled on or off in the event of a detected communication failure.

The specific configuration of a lead unit 2 and a remote unit 4x will be described by an example command message, within a DPC train having a lead 2 and two remote units, 4a and 4b as shown in FIG. 1. The example operation will be described in the mode used after execution of a linking procedure, which is described further below, which transfers particular communication parameters, including which particular remote 4x is allocated to which time slot of the below-described time division multiple access channel allocation (TDMA) scheme. The details of the linking procedure, however, are not critical to an understanding of the present invention. Therefore, the various embodiments will be first described in terms of sequences, protocols, and procedures pertaining to substantive communications between the lead unit 2 and remotes 4x on the assumption that the later-described linking procedure has already been completed.

Figure 3:
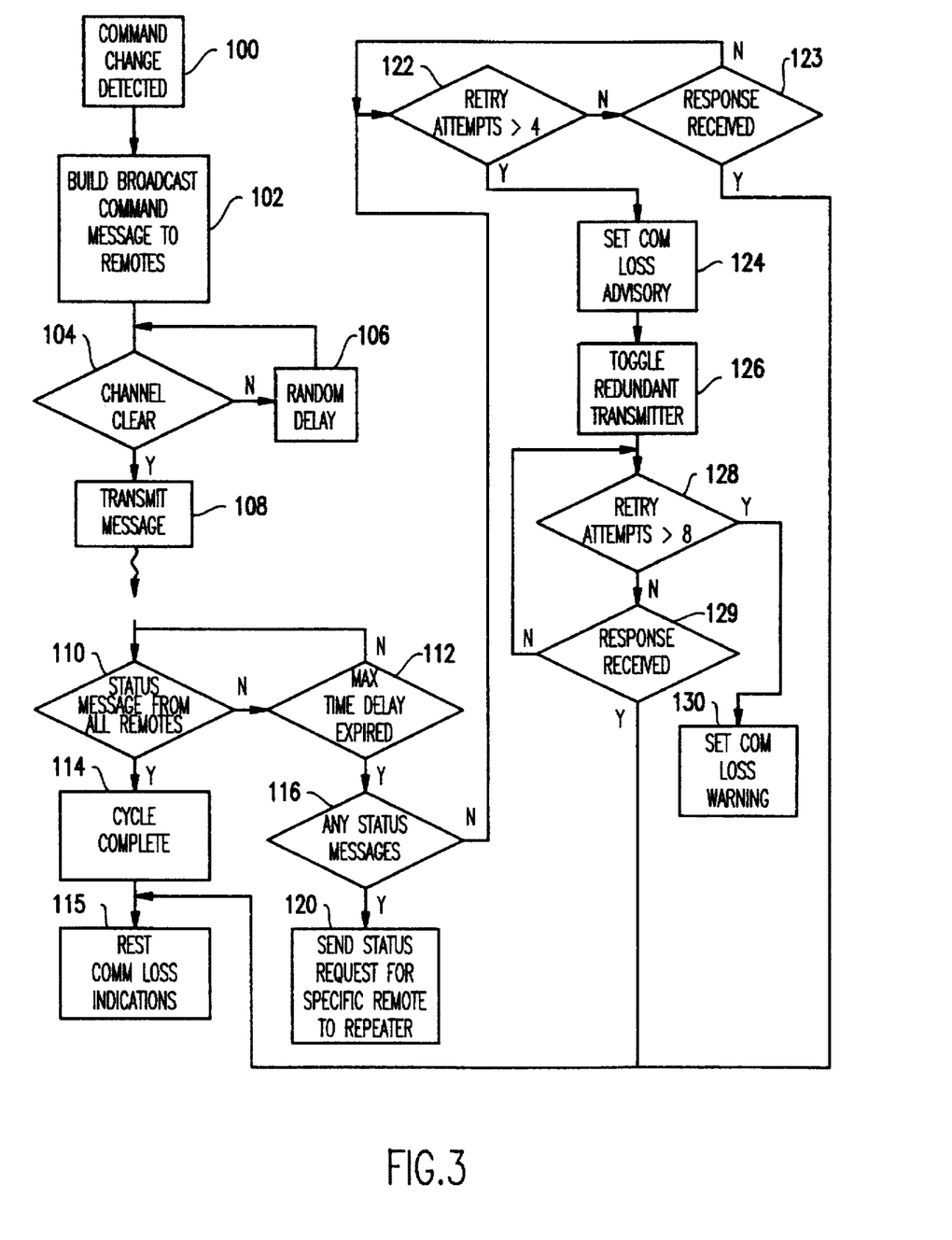
FIG. 3 is a flow chart of a lead unit of FIG. 1 sending a command message and processing the remote units' replies.

Referring now to FIGS. 2 and 3, the sequence starts at block 100 by lead unit 2 receiving a command signal (not labeled), indicating a command change, which is generated by any of several command signal sources, such as, for example, the keyboard 16. Other command signal sources are, for example, the brake system 22 and the trainline interface module 18. At block 102 the lead unit verifies the entered command signal and retrieves the corresponding command data from memory, and "builds" or assembles for transmission to the remotes 4x a command message according to the following example format:

| Command Message Field Description | Bytes |
|---|---|
| Synchronization (11001100 ... ) | 12 |
| Frame Sync | 2 |
| Message Length | 1 |
| Message Type | 1 |
| Lead Unit Address - Train ID field | 2 |
| Lead Unit Address - Train Position of Message Originator and Destination field | 1 |
| Lead Command Data | 12 |
| Status Data from Remote Unit Originating Message | 7 |
| CRC-16 Error Detection | 2 |
| End of Message | 1 |
| TOTAL MESSAGE | 41 |

The number of bytes for each of the fields is for descriptive purposes only and, in practice, is dependent on design choice together with the then-current AAR specifications.

The example message format has nineteen bytes of core user data, which consists of twelve bytes of Lead Command Data and seven bytes of Status Data from Remote Unit Originating Message. The latter seven byte field is used by the remote units 4x that repeat the command message, but not in the messages' first transmission by the lead unit 2. Instead, in the lead unit's first transmission of a command message, the field is a null of seven unused bytes. The set of 12-byte command messages includes throttle and dynamic brake setting, air brake command settings, direction and other optional discrete signals, for each of up to six remote units.

The lead unit 2 uses the above-described message structure for routine status requests, including those requiring no status change in the controls connected to the remote units 4x, in such a case, the currently valid command state would be repeated in the message. As described further below, the same message structure can be applied to alarm messages, which are described below, initiated by a remote unit 4x. For such messages, all of the example format's nineteen data bytes can be used to convey the alarm data. This would be identified by the Message Type field.

Referring again to FIGS. 1–3 and to Table 1 above, each DPC unit 2 and 4x within a train inserts a unique three byte address in the Lead Unit Address field for all messages. Two bytes of the Lead Unit Address are for the unique Train ID or AAR identifier, of the lead locomotive, which can function as the unique identifier for the entire train. This 16-bit Train ID AAR identifier is contemplated as being set by the AAR. The third byte of the Lead Unit Address is the origination/destination index or byte, having, for this example, three bits allocated for the originator DPC unit and 3 bits for the destination DPC unit. The Message Type one-byte field is used to define different message types.

Using a 4,800 bps modem, the above-described forty-one byte message occupies 68 ms. Added to the nominal radio transmitter attack time of 15 ms, there is a total of 83 ms from the time a message transmission begins to when it is completed. Accordingly, for the time division multiple access scheme described below, slots of 100 ms are used for slotting messages between units 2 and 4x. This provides 17 ms between the end of a message for the units 4x to process a response.

Communications within the present system are by a Carrier Sense Multiple Access (CSMA) channel with a potential for multiple proximal trains at the same frequency. Accordingly, referring to FIG. 3, after assembling the command message at block 102, the lead unit 2 proceeds to block 104 and checks for the channel to be clear, for a time period slightly longer than the time of the sequential message time gaps which, for this example, are 100–83=17 ms. Therefore, for this example, block 104 uses a 20 ms clear time before channel access. If block 104 finds the channel in use (i.e., not clear for 20 ms) by another train, it will go to block 106 and delay for a randomly distributed time period ranging from $T_{min}$ to $T_{max}$, and retry.

$T_{min}$ and $T_{max}$ correspond to the minimum and maximum time for a complete command sequence from the other train's lead unit 2 to all of its remote units 4x and for all of its remote units 4x to transmit their responses, as described further below. Assuming, for example, a maximum of six remote units 4x on any train, and assuming a 4,800 bps modem, $T_{min}$ and $T_{max}$ are 0.5 and 1.5 seconds respectively. If the second try at block 104 is still busy, repeated tries will be made each $T_{min}$ seconds until the channel is clear. After the channel is determined clear, the lead unit 2 proceeds to block 108 and the active transmitter (or transmitter section) 8 is keyed. The key-up-to-full power time is typically 15 ms and, therefore, there is a 15 ms delay before the command message is transmitted.

After transmission, the above-described command message is received by remote 4a and, nominally, by remote 4b. As shown in FIG. 3, the lead unit 2 next, at block 110, proceeds to process the status messages from each of the remote units 4x (4a and 4b for this example). The remote unit's generation of these status messages will now be described, referring to FIG. 4, before returning to the lead unit 2 processing in FIG. 3.

Figure 4:
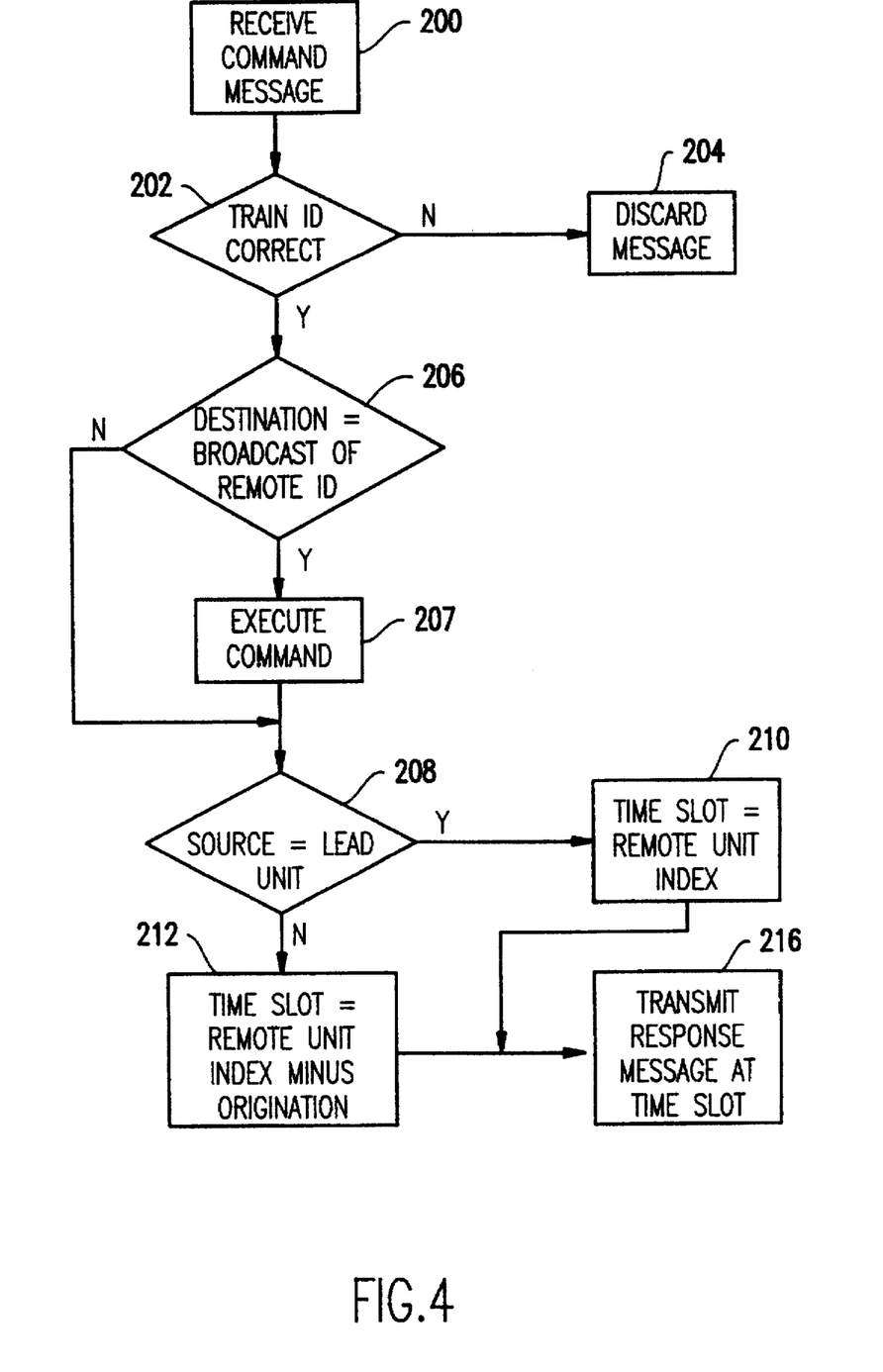
FIG. 4 is a flow chart of a remote unit of FIG. 1 receiving a command message and transmitting a reply with a repeat of the command.

Referring to FIG. 4, all of the remote units 4x receive the command at block 200 and then, at step 202, compare the stored train identifier (not numbered) with the received message train identifier. If there is no match, the message is discarded at step 204 and the remote 4x returns to a message wait state or to any processing that was interrupted by receipt of the now-discarded command message. If step 202, however, indicates a correct train identifier in the received command message, the destination field is then checked, as shown at block 206. If the bit pattern, for this example, is equal to seven, this indicates that the message is a broadcast intended for all remote units 4x in the train. If not a broadcast identifier, the remote unit 4x then checks the destination field to determine if the field contains a value which corresponds to the receiving remote unit identifier, which is between, for example, one and six. If the answer is "yes", the process proceeds to block 207 where the command in the received message is executed, but if the answer is "no", the process bypasses block 207 and goes directly to block 208 where the remote unit 4x determines the index of the originator.

A status message is sent by each remote unit 4x at processing block 216. The status message for each remote unit is time slotted into a corresponding response predetermined time slot RTx. For this example having two remote units, 4a and 4b, the time slots are RTa and RTb. The time slots RTx, e.g., RTa and RTb, are selected according to a Time Division Multiple Access (TDMA) scheme keyed to the position of the remote unit in the train and, hence, the time of receiving the command message.

The predetermined time slot is computed at each remote unit in the following sequence. For this example, an originator index of "0" indicates a lead unit 2 and an originator index of "1" through "6" indicates a remote unit 4x. Based on the originator index, the receiving remote 4x determines the time slot for responding to the command message. This provides for the remote unit 4x receiving multiple copies of the same command from remote units located between it and the lead unit 2. In such a case, as shown in blocks 210 and 212, the remote 4x will recalculate its response time slot based on the originating index of the message. For example, if the subject remote's index is "3", and the received message has an originator index of "0", indicating a lead unit 2, the subject remote will use block 212 and the calculated time slot will be (3−0=3) times 100 msec, which would be 300 msec. If the first remote unit, having an index of "1" responds to the same command and the subject remote unit receives the first remote unit's repeat of the command, the repeated command will have an origination index of "1" and, as shown in block 210, the calculated time slot for responding will be (3−1=2) times 100 msec−200 msec. This ensures that the subject remote unit 4x maintains its time slot in the TDMA scheme, regardless of whether or not remote units 4x ahead of it have answered the same command message. The remote unit 4x then, at block 216, transmits a message according to the above-described message format, having both the received 12-byte command message repeated and its own 7-byte status response.

For the present example of two remote units, 4a and 4b, the remote unit 4a's response message contains a repeat of the 12-byte command from lead unit 2, together with 4a's own 7-byte status message. Remote unit 4b also executes the same FIG. 4 routine based on the original transmission of the command from the lead message from the lead unit 2. However, in the event remote 4b failed to receive the original command from the lead unit 2, it will receive the re-transmitted command sent by remote unit 4a. Accordingly, remote unit 4b has two opportunities to receive the command data; a first time from the lead unit 2, and a second time embedded within the remote unit 4a's response message. This provides, remote unit 4a the same functionality as a repeater, without initiating a separate repeater message and, hence, without incurring the repeated message overhead. Note, as shown in FIG. 4, that remote unit 4b will again repeat the command message in its response message. Therefore, if a third remote unit 4x were located further from the lead unit 2 than remote unit 4b, it will receive and carry out remote unit 4b's repeated command.

Accordingly, remote units 4x within RF range of each other may receive duplicates of the command information. In addition, the lead unit will see its own command messages repeated back to it, which can be used for verification that the commands were correctly received, as a higher level of security. Thus, even if a command is not meant for a specific remote unit, the status message received from that remote unit in its predetermined time slot in the TDMA scheme provides a continuity check verifying the communication link between the lead unit and the remote unit without incurring any additional overhead in the communication channel.

As mentioned above, the slots are 100 ms wide to accommodate the 83 ms message duration and processing time. Therefore, if remote units 4a and 4b both receive a particular command message from the lead unit 2 beginning at t=0 seconds, then remote unit 4a's time slot RTa will be from t=100 ms to t=200 ms, and remote unit 4b's time slot is from t=200 ms to t=300 ms. If remote 4b does not receive the lead transmitted command simultaneously with remote 4a, but instead receives the repeated command embedded in remote unit 4a's response during time slot RTa, (t=100 ms to t=200 ms), then remote unit 4b will still process the (repeated) command and then transmit its reply in time slot RTb (t=200 ms to t=300 ms).

Referring now to FIG. 3, the lead unit 2 at block 110 receives the status messages from each of the remote units 4x, for this example 4a and 4b, and checks to determine the message's validity and content. Block 110 retrieves from lead unit 2's storage the identification of each of the remote units 4x that are installed in the train, and thereby, has information sufficient to determine whether all of those remote units 4x have sent a status message. The time elapsing as the lead unit 2 receives and verifies the status messages is counted by a software timer or software loop counter at block 112. If block 110 detects a valid status message from each of the remote units 4x before the timer at block 112 times out, then the cycle completes at block 114, proceeds to block 115 to reset all communication loss indications, described below, and waits for detection of another command change at block 100 to repeat the cycle. If, however, the block 112 timer expires prior to block 110 detecting a valid status message from each of the remote units 4x, it proceeds to decision block 116. For this embodiment, decision block 116 is disabled to a "no" position, or not included, and the lead unit 2 automatically proceeds to block 122 to initiate retransmission of the command message. Therefore, for this example embodiment, the lead unit 2 retransmits the command message if it fails to receive a status message from any of the remote units 4x, regardless of its receiving a status message from one or more of the remote units 4x. In the second embodiment, described further below, the lead unit 2, as shown by decision block 116, will send a message to a designated repeater at block 120 for a repeat of missing status message(s), provided at least one status message was received.

For the present embodiment, if any status messages are missing, the lead unit 2 program assumes that the command was corrupted by another train signal or by environmental factors and goes to blocks 122 through 130. More particularly, as depicted in FIG. 3, block 122 first determines if the number of retransmission attempts exceeds a first limit of, for example, four. It is assumed for purposes of this description that the block 122 counter is reset at initialization and by the above-described block i 15. If the number of retransmission attempts at block 122 is less than the first limit (four in this example), the process goes to block 123 to determine if a status message has been received from the remote unit. If so, the process goes to block 115 where the counter is reset. However, when the first limit is exceeded, a communication loss advisory is set on the visual display 14 (FIG. 2). Other modes for indicating a communication loss advisory to the user are an audible alarm (not shown) or equivalents known in the art. After the communication loss advisory is set, the redundant transmitter (or transmitter section) at the remote is toggled on at block 126. This can be accomplished in either or both of two ways. The basic assumption is that the remote unit with both redundant receivers (or receiver sections) on is receiving the transmission from the lead unit, either directly or by rebroadcast by an intervening remote unit. The remote unit is therefore programmed to toggle its redundant transmitter on (and the other transmitter off) when it receives the transmission four times. Alternatively, or in addition to, the lead unit can, after four transmissions, then transmit a command to the non-responding remote unit to toggle its redundant transmitter on. In addition, the lead unit 2 may also toggle its redundant transmitter (or transmitter section) on and would do so in the event that no status message was received from any remote unit in response to a transmission from the lead unit. The lead unit continues to retransmit and monitor for a reply from the non-responding remote unit. The number of attempts continues to accumulate and the number is checked in block 128 and, if the number of attempts is less than a second predetermined limit (eight in this example), a check is made if block 129 to determine if a response has been received. If so, the process goes to block 115 to reset the counter. However, if block 128 determines that the number of retransmission attempts exceeds the second limit (eight), the process goes to block 130 where a communication loss warning is displayed or output by means similar to or identical to those employed to display or otherwise output the communication loss advisory.

Following a lead unit 2 initiated communications sequence, the RF channel will be given priority use for units 2 and 4x within the same train. This will consume the RF channel from $C_{time}$ (min) to $C_{time}$ (max), with most transactions being completed within the median between those times, where $C_{time}$ (min) and $C_{time}$ (max) correspond to the number of remote units 4x and to the number of repeat transmissions as are described for the second embodiment below. During this time, the RF channel will be in continuous use by the lead unit 2 and remote units 4x, except for the brief timing (approx. 20 ms) between sequential messages.

The above embodiment has been described assuming that failure of the lead unit 2 to receive a status message from a remote 4x indicates that the remote did not send the message. However, depending on the antenna pattern of units 2 and 4x, and the apparatus' signal receiving sensitivity, and environmental factors, the broadcast range of the remote unit 4x, for example 4b, may not be sufficient for the lead unit 2 to directly receive its status message.

Figure 5:
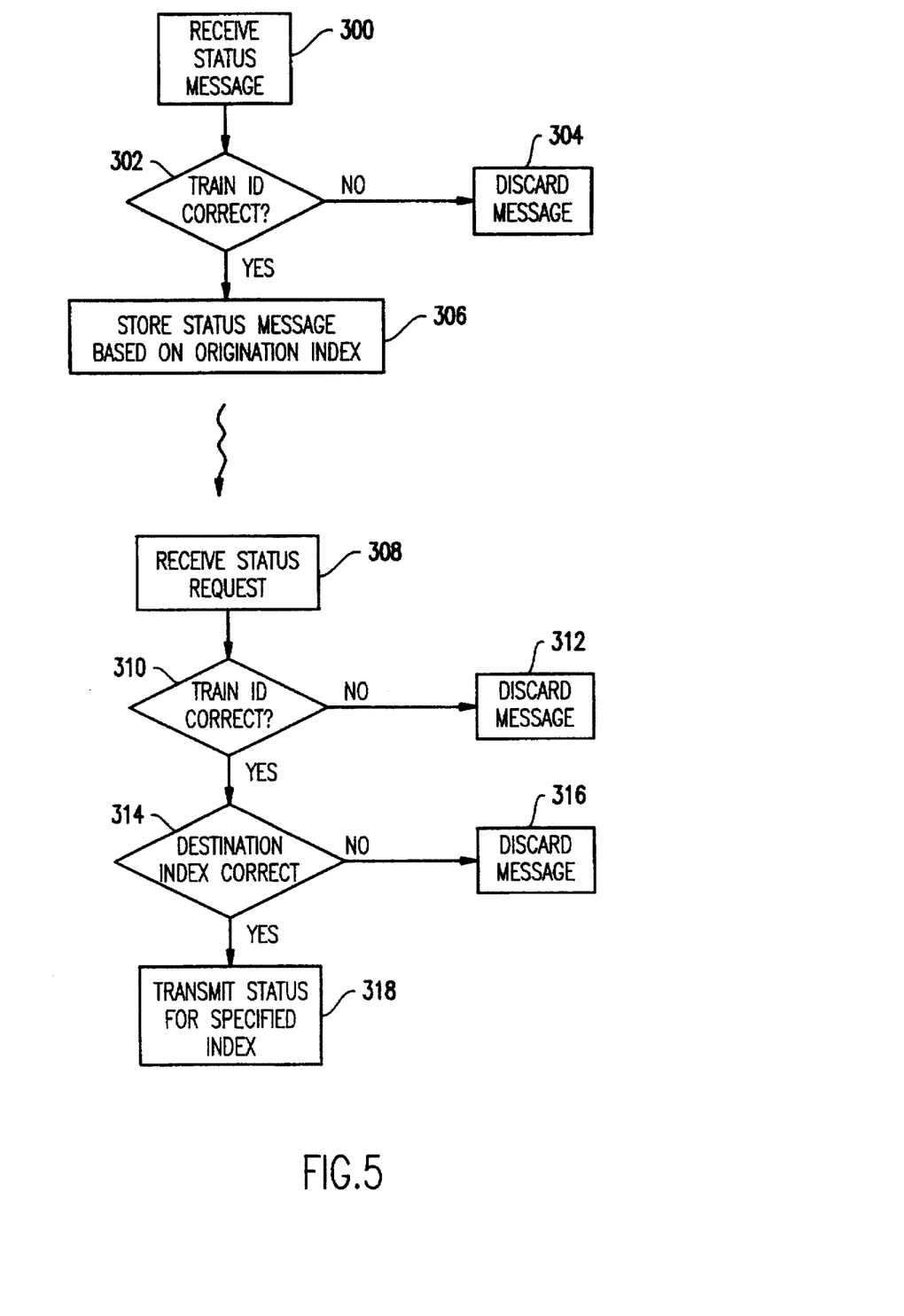
FIG. 5 is a flow chart of a remote, according to a further embodiment, receiving and storing a reply from another remote, and processing a status request from a lead unit.

As indicated above, there is a further, or second, embodiment shown in FIGS. 3 and 5 directed to overcoming the remote unit 4x range problem. In this second embodiment, one or more of the remote units 4x is configured by software to additionally function as a status message repeater for the status messages sent by a subset of or all of the remaining remote units 4x. For a better understanding of its operation, this embodiment will be described in reference to a particular example system having two remote units, 4a and 4b, with remote 4a as the designated status message repeater. Referring now to FIG. 5, at block 300 remote unit 4a receives a status message from remote unit 4b. The status message from remote unit 4b is formatted as for the previous embodiment, having forth-one bytes and having a repeat of the command message. Accordingly, block 300 functions identical to block 200 in FIG. 4. After receiving the status message, block 302 compares the two-byte Train ID field of the Lead Unit Address of the message with the remote unit 4a's pre-stored Train ID. If the Train IDs do not match, the message is discarded and the process terminates at block 304. If the received Train ID matches then, at block 306, the received status message is stored, along with the originating remote unit 4x address, which is remote unit 4b for this example, based on the message's one-byte Train Position of Message Originator (also termed the originator index) field of the Lead Unit Address. If additional remote units 4x are present, then remote unit 4a will also receive and store the status message from either all or, depending on the apriori programming of remote unit 4a, from a predetermined subset of those remote units 4x. If i-emote unit 4a is programmed to only receive and store the status messages from a predetermined subset of the remote units 4x, it can discriminate, and store for specific retrieval, according to the messages' Train Position of Message Originator (or originator index) or the time slot RTx in which the message is received. Referring again to FIG. 5, remote unit 4a stores the received status messages in its control module 12 at block 306.

Returning now to FIG. 3, as described for the previous embodiment, the lead unit 2 determines, at block 110, if status reply messages have been received from all remote units 4x. If the answer is "no", then, after the time out at bock 112, the lead unit 2 proceeds to block 116 to determine if any status messages are received from any of the remote units. If the answer is "no" the unit proceeds to block 122, as described above. If the answer is "yes" this indicates that one or more of the status replies have been received, which indicates that the lead unit 2 command message was transmitted and, therefore, the failure is likely due to corruption of one or more of the remote units' reply transmissions. The lead unit 2 will then, for this embodiment, proceed to block 120 and send a status request message to the remote unit(s) 4x that was (were) apriori designated as a repeater unit for the remote unit 4x whose reply message was determined missing at block 110. The status request command has the described forty-one byte format used for all communications between units 2 and 4x, or between different remote units 4x, with the command and status fields being unused.

The specific request strategy is a design choice which further depends on the specific configuration of remote units 4x. More particularly, a system having two remote units, 4a and 4b, with 4a closer to the lead unit 2 than remote unit 4b, will program remote unit 4a to store the status messages from remote unit 4b. If the lead unit 2 does not receive a status message from remote unit 4b, then a simple request command will be transmitted to remote unit 4a. If, however, there are three remote units, say remote units 4a, 4b and 4c, and remote unit 4a is programmed to receive and store the status messages from remote units 4b and 4c, the request command will specify which remote unit 4x for which the status is requested. More specifically, if lead unit 2 detects a missing status from remote unit 4b, it will transmit a command for remote unit 4a to retrieve and send only the status message from remote unit 4b.

Referring to FIG. 5, remote unit 4a receives the status request message at block 308, checks the Train ID field of the Lead Unit Address at block 310 and, if there is no match, discards the request at block 312. If the Train ID matches, the process proceeds to block 314 and checks the four-bit Train Position of Destination field (or destination index) of the message. If the destination index does not match that of remote unit 4a, the message is discarded at block 316. If the destination index matches, the process proceeds to block 318 and, if there was a valid status message from remote unit 4b resident in remote unit 4a's memory, the remote unit 4a retrieves and transmits it to the lead unit 2. Depending on design choice, remote unit 4a could either send no message or a message indicating "nothing found" if there if no valid status message from the requested remote unit, for this example 4b, resident in its memory.

In operation, the above-described embodiments, an example system having one lead unit 2 and two remote units, 4a and 4b, will complete most command/response sequences in only three messages. The first message is the command transmission by lead unit 2. The second message is the reply message from remote unit 4a, having remote unit 4a's status message and a repeat of the lead units' command. The third message is the reply from remote unit 4b. For the second embodiment, in cases where the status of remote unit 4b needs repeating via remote unit 4a, the total increases to five messages. The fourth message is the request command from the lead unit 2 to the remote unit 4a, and the fifth message is remote unit 4a's response. As described above, a 100 ms message slot provides for transmitter key-on, transmission of the forty-one byte message protocol and time for units 2 and 4x to process the received message. Accordingly, the full messaging exchange sequence would normally be completed in 300 ms, which is the $C_{time}$ (min) defined above, sometimes extending to 500 ms, which is $C_{time}$ (max). As previously stated, the CSMA scheme, in response to a lead unit 2 initiated communications sequence, gives priority use of the channel for units 2 and 4x within the same train until the exchange sequence is complete.

Message collisions in the above-described embodiments would be expected to be very few, but would occasionally occur with multiple trains operating in the same RF area. This will result in corrupted messages, which would be detected by the lead unit 2 based upon lack of response from one or more of the remote units 4x within their designated time slots. In this case, the lead unit 2 would simply initiate another command message, as shown in FIG. 3.

The embodiments have been described with examples having two remote units, 4a and 4b. The invention, however, contemplates additional remote units 4x. For example, a system having six remote units 4x requires a total of only seven messages, which is 700 ms, to send a command from the lead unit 2, repeat the command six times and transmit six status messages, one from each of the remote units, in the event that no status message needed repeating. Since the command has been repeated six times over the 700 ms span, a very high level of data communications integrity can be achieved, even where there may be a temporary loss of RF path between the lead unit 2 and all remote units.

With the example system having six remote units 4x, each of the remote units 4x could be programmed as a repeater unit to repeat status messages from the end (the remote unit 4x furthest from the lead unit 2) to the from (the lead unit 2)

of the train. The repeat of the status messages could be sent only in response to a repeat request from the lead unit, as described for the second embodiment. Alternatively, or in addition, the remote units 4x could be programmed so that the fifth remote 4x (which is the second most distant remote unit) automatically repeated the status message from the sixth remote unit 4x (the most-distant remote). The fourth remote unit 4x would automatically repeat the status message from the fifth and sixth remote units 4x. This would continue until the first remote unit repeated status messages from the second through sixth. However, the multiple repeats for this scheme might require excessive channel use. For example, the status message from the sixth remote unit 4x would be repeated five times.

Accordingly, another embodiment of this invention programs only one of the middle remote units 4x, which would be 4c with the example of six remotes 4x, as the status repeater. In this embodiment, if the lead unit 2 does not receive a status message from either of remote units 4d, 4e or 4f, it would send a status request command to remote unit 4c as described for the second embodiment. It would be a design option for remote unit 4c to retransmit the status of all of remote units 4d, 4e and 4f in response, or only retransmit the status of one from among the three. With the latter option, the lead unit 2 transmits one status request to remote unit 4c for each remote unit from which it did not receive a status message.

Figure 6:
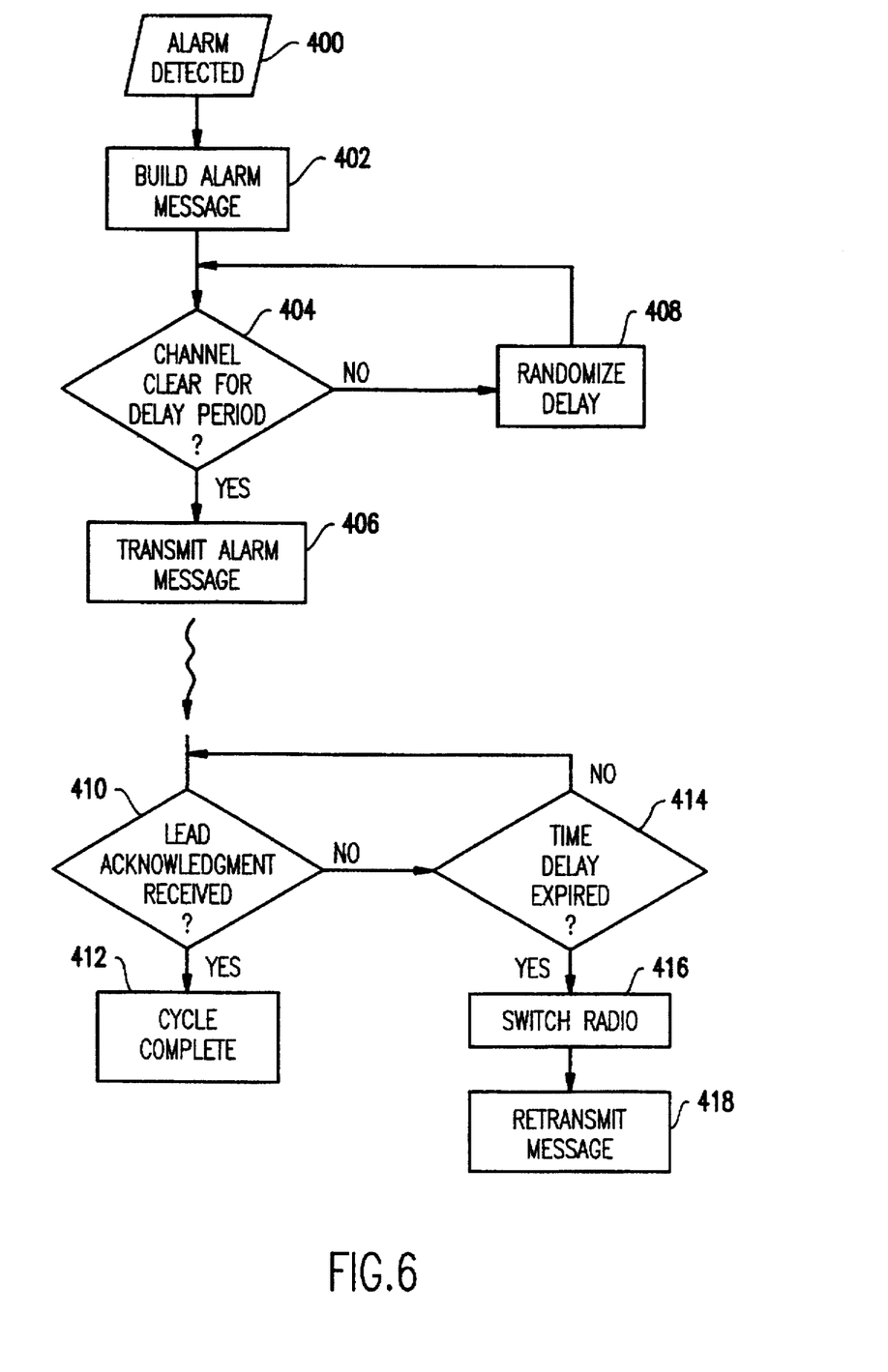
FIG. 6 is a flow diagram of a communication, according to a still further embodiment, initiated by a remote unit.

The embodiments above have been described as initiating messages from the lead unit 2. Referring to FIG. 6, this invention also contemplates the remote units 4x as having a mode for initiating certain types of messages, such as alarms, without waiting for a command from the lead unit 2. More particularly, in this further embodiment, remote units 4a and 4b, using the CSMA method and byte format described for the lead unit 2, poll and access the channel in the manner described for the lead unit 2. Referring to FIG. 6, this embodiment envisions at least two kinds of remote-initiated messages. The operation of this embodiment assumes, as for the previous embodiments, that the linking procedure which is described further hereinbelow, already been executed.

The first example kind of remote-initiated message is an Advisory Message. An Advisory Message is a low priority non-critical message sent for advice only, which does not require the lead unit 2 to acknowledge receipt or reply. Examples of Advisory Messages are periodic updates of fuel levels and fuel efficiency, and relaying of parameters received from the end-of-train monitoring systems. The second type of remote-initiated message is an Alarm Message. An Alarm Message is a message representing a critical condition which requires acknowledgment of receipt by, and a responding command from, the lead unit 2. Examples of Alarm Messages are a detection of excessive air flow, detection of a low main air reservoir pressure, and mismatches between desired and actual brake and throttle settings. Referring to FIG. 6, the remote unit 4x sends these Alarm and Advisory messages as follows.

First, the remote unit checks, at block 404, to see if the CSMA channel has been clear for the above-described time period of, for these examples, 20 ms. The 20 ms time delay is based on the example 17 ms sequential message time gap. If the channel is not clear then, at block 408, the remote generates a randomized delay number, having a range of, for example, the above-described $T_{min}$ of 0.5 seconds to $T_{max}$ of 1.5 seconds. These examples of $T_{min}$ and $T_{max}$ are based on a system maximum of six remote units 4x. The loop of blocks 404 and 408 is repeated until the channel is clear, at which time the Alarm or Advisory message is transmitted. At block 406. The process is complete at that point if the message is an Advisory message, since no acknowledgment from the lead unit 2 is required. If the message is an Alarm, the sending remote unit 4x proceeds to block 410 and waits, subject to the time delay count of block 414, for the lead unit's acknowledgment. If the acknowledgment is received before a time out from block 414 the cycle is complete at block 412. If the block 414 time period expires, the remote proceeds to block 416, toggles its redundant transmitter (or transmitter section) and retransmits the Alarm at block 418. After the retransmission, the remote resets the 414 timer, returns to block 410 and again waits for an acknowledgment from the lead unit 2.

This embodiment's example operation of transmitting Alarm and Advisory messages has been described for direct transmission from the remote unit 4x to the lead unit 2. However, if initiated from a remote unit 4x farther from the lead unit 2 than the designated repeater remote unit 4x, the Alarm or Advisory message would be directed to the repeater unit 4x for rebroadcast to the lead unit. Likewise, if the lead unit 2 receives the message via the repeater remote unit 4x, the acknowledgment response would also be repeated.

Figure 7A:
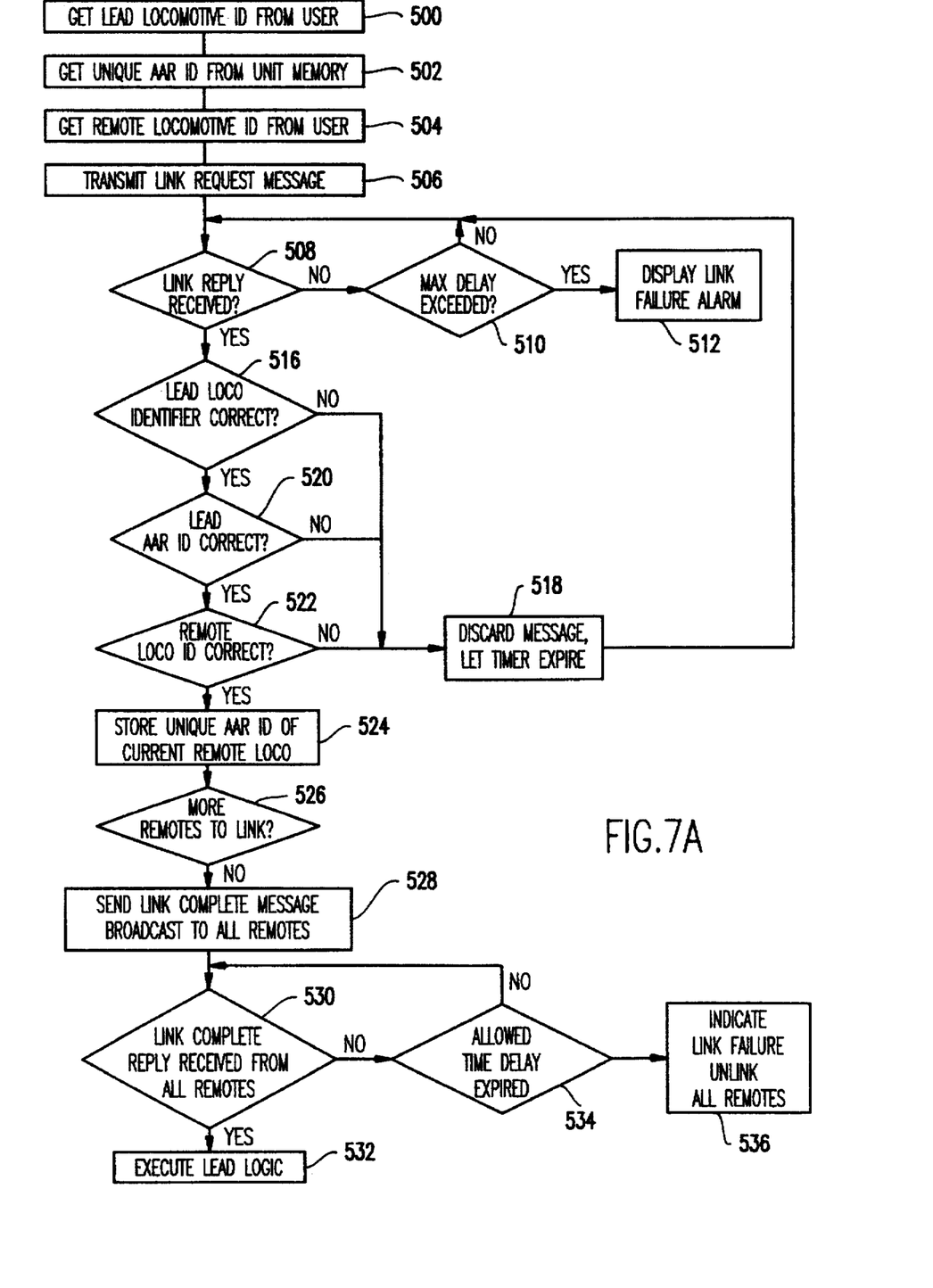
FIGS. 7a and 7b together depict a linking procedure for establishing a communication link between units of each of the FIG. 1–6 embodiments.
Figure 7B:
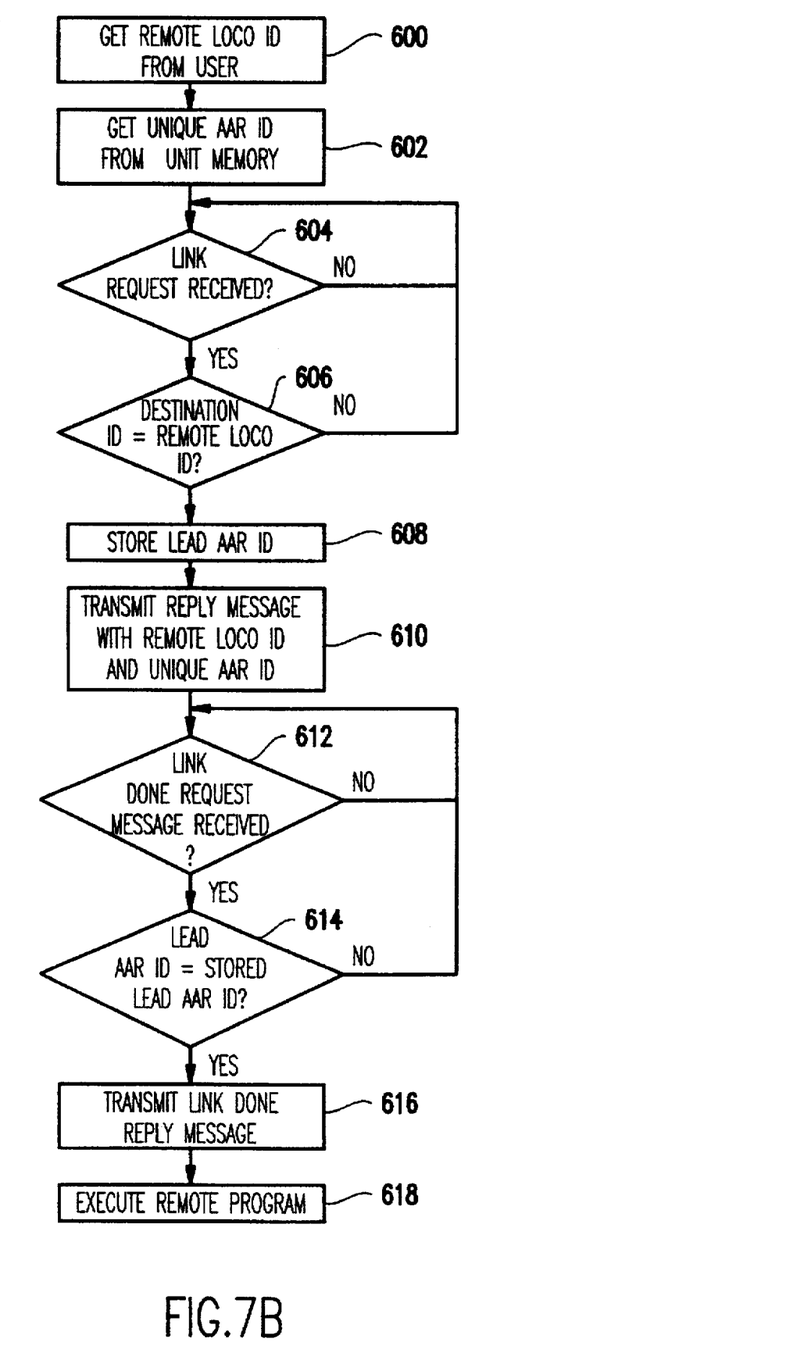

As is stated above, the present invention executes a linking procedure, prior to transmission of command messages, which loads units 2 and 4x with the above-described 2-byte AAR identifiers for subsequent addressing and message verification purposes. Referring now to FIGS. 7a and 7b, an example linking procedure will be described. The example format used for the link request/reply messages transmitted during this procedure is as follows:

| Link Request/Reply Message Field Description | Bytes |
|---|---|
| Synchronization (11001100 . . . ) | 12 |
| Frame Sync | 2 |
| Message Length | 1 |
| Message Type | 1 |
| Time Synchronization | 4 |
| Lead Locomotive ID | 2 |
| Lead Unit Address | 2 |
| Remote Index | 1 |
| Remote Locomotive ID | 2 |
| Remote Unit Address | 2 |
| Remote 1 Address | 2 |
| Remote 1 Position | 1 |
| Remote 2 Address | 2 |
| Remote 2 Position | 1 |
| Remote 3 Address | 2 |
| Remote 3 Position | 1 |
| Remote 4 Address | 2 |
| Remote 4 Position | 1 |
| Remote 5 Address | 2 |
| Remote 5 Position | 1 |
| Remote 6 Address | 2 |
| Remote 6 Position | 1 |
| TOTAL MESSAGE | 47 |

The example linking process begins at block 500, which is initiated by a prompt generated when the system is initially started. At this time the user decides whether the particular hardware unit 6 is a lead unit 2 or a remote unit 4x. If the unit 6 is a lead unit 2, the user enters the Lead Locomotive ID, through the unit's keyboard 16 or other input device (not shown). The Lead Locomotive ID is, for this example, a four digit (2-byte) number assigned to the lead locomotive by the specific operating railroad. The four digit number would, in general, be painted or otherwise affixed to the lead locomotive. In response, the lead unit 2 processor 12 retrieves the pre-loaded Lead Unit Address from its memory. The Lead Unit Address is a unique 16-bit value which can be considered a serial number, and which is contemplated as being maintained by the AAR. Next, at block 504, the user inputs the Remote Locomotive ID for each of the remote locomotives in the train. Similar to the Lead Locomotive ID, each of the Remote Locomotive IDs is a four digit (2-byte) number painted or otherwise affixed to its corresponding remote locomotive.

Referring to FIG. 7b, the remote unit 4x in each of the remote locomotives is configured at this time. First, at block 600, the user enters the particular remote locomotive's Remote Locomotive ID through the remote 4x's keyboard 16 or Other input device. This Remote Locomotive ID is identical to one of the Remote Locomotive IDs entered into the unit 2 at block 504. The remote 4x then, in response, fetches the 2-byte pre-loaded Remote Unit Address from its memory, corresponding to the entered Remote Locomotive ID. The Remote Unit Address is a unique number that is contemplated as being maintained by the AAR.

Referring back to FIG. 7a, the lead unit next, at block 506, assembles and transmits a link request message and waits, at block 508, for the link reply messages which the remote units 4x generate as described below.

Referring now to FIG. 7b, the link reply message is generated and transmitted according to the following example procedure. The remote unit 4x waits at block 604 for a link request message. When a message is received the remote unit 4x checks if the link request message's destination ID matches the ID of the receiving unit 4x's remote locomotive. If there is no match, the process returns to block 604 to await another link request message. If the destination ID matches the remote locomotive ID, the remote unit, at block 606, stores the lead AAR ID contained in the link request message. The remote unit 4x then, at block 610, transmits a link reply message containing the remote locomotive ID and the unique AAR ID. Next, the remote unit 4x waits, at block 612, for a Link Complete message from the lead unit 2, which is described below.

Referring again to FIG. 7a, the lead unit, which is waiting at block 508, detects the link reply message, provided the reply is received before the maximum delay at block 510. If there is no reply message received before the time out, the lead unit proceeds to block 512 and generates a link failure alarm. This would, for example, be a display (not shown) on the display unit 14. If the reply is received before the time out, the lead unit first checks the lead locomotive identifier 112) of the reply message. If it does not match the lead unit's pre-stored identifier, the message is discarded and timer is allowed to expire at block 518, and the process returns to block 508. If there is a match, the lead unit checks the Lead AAR ID from the reply message. If it does not match the lead unit's pre-stored Lead AAR identifier, the message is discarded and the process returns to block 508. If there is a match, the lead unit checks the remote locomotive field of the link reply message. Again, if there is no match, the reply is discarded and the process returns to block 508. If there is a match, the lead unit stores, at block 524, the Unique AAR ID of the remote locomotive and proceeds to decision block 526 which determines, based on the user's input, if there are more remotes to link.

If the user enters data indicating that there are more remote units 4x to which a communication link must be established, the process returns to block 504 for input of the next remote locomotive ID. Steps 506 through 524 are repeated until block 526 determines that there are no further remote units 4x with which to establish a communication link. The lead unit then, at block 528, transmits a Link Complete message to all of the remote units 4x. The lead unit 2 then proceeds to block 530 where it waits for a reply to the Link Complete message from each of the remote units 4x. As shown in FIG. 7b, the remote unit 4x waits, at block 612 for the Link Complete message and, upon receipt, compares the messages' Lead Unit Address (AAR ID) with the remote's previously stored Lead Unit Address (AAR ID), as shown in block 614. If the IDs do not match, the remote unit 4x returns to block 612 to await a Link Complete message. If there is a match, the remote 4x proceeds to block 616 where it transmits a reply to the Link Complete message and then to block 618 to execute the pre-loaded remote program. The remote program includes, for example, executing the received command messages from the lead unit 2 and controlling the remote locomotive subsystems in response. The control operations include, for example, controlling the brake system and other trainline control systems to perform the command message's instructed functions. Further, the remote program monitors the subsystem's status parameters for response to the instructions.

Referring again to FIG. 7a, the lead unit waits at block 530 for the remote units' replies to the Link Complete message. If all of the replies, i.e., one from each of the remote units 4x, are not received before the maximum time then, through blocks 534 and 536, the lead unit 2 indicates a link failure and unlinks all of the remote units. The indication of the link failure could, for example, include a message on the visual display 14. If a reply is received from all of the remote units 4x then, at block 532, the lead unit proceeds to execute its above-described receipt of inputs from the user, and generation and transmission of corresponding command messages. The lead unit program represented by block 532 can also include a step of verifying the internally generated command message before transmitting it to the remote units.

While the invention has been described in terms of a several preferred embodiments, those skilled in the art will recognize that the invention can be practiced with modification within the spirit and scope of the appended claims.

Having thus described our invention, what we claim as new and desire to secure by Letters Patent is as follows:

1. An intra-train radio communication system comprising:
   a lead unit in a first locomotive having a first means for transmitting a command message;
   a first remote unit in a second locomotive having means for receiving said command message and means for generating a first response message according to said command message, said first response message being generated in a first time slot and containing a first status message and containing a message representing said command message; and
   a second remote unit in a third locomotive having means for receiving said command message, means for receiving said first response message, and means for generating a second response message according to the said message representing said command message, said second response message being generated in a second time slot and containing a second status message and containing a message representing said command message, said lead unit monitoring said first and second time slots for said first and second response messages.

2. An intra-train radio communication system according to claim 1 wherein said lead unit further comprises means for inserting a destination identifier in said command message and wherein said first remote unit further comprises means for inserting a destination message in said first response message representing said destination identifier in said command message.

3. An intra-train radio communication system according to claim 2 wherein said second remote unit further comprises means for storing a second remote destination identifier, and means for comparing said stored remote destination identifier with the destination identifier in said received command message and for comparing said stored remote destination identifier with the destination identifier in said received first response message, and means for responding to said command message and said first response message in accordance with said comparisons.

4. An intra-train radio communication system according to claim 3 wherein said lead unit further comprises means for inserting a lead origination identifier in said command message and wherein said first remote further comprises means for inserting a first remote origination identifier in said first response message.

5. An intra-train radio communication system according to claim 3 wherein said second remote unit further comprises means for detecting the lead origination identifier in said command message and for detecting the first remote origination identifier in said first response message and for discriminating between said command message and first response message in accordance with the detecting and for generating a discrimination data in response.

6. An intra-train radio communication system according to claim 5 wherein said second remote unit further comprises means for transmitting said second response signal at a time selectable between a first time interval and a second time interval after receipt of any of said command message and said first response message, said selection being in accordance with said discrimination data.

7. An intra-train radio communication system according to claim 1 wherein said lead unit further comprises:
means for receiving said first response message and said second response message;
means for detecting if any of said first response message and said second response message are not received within a predetermined time period after transmitting a command message; and
means for retransmitting the command message for a predetermined number of times or until both said first and second response messages have been received, whichever occurs first.

8. An intra-train radio communication system according to claim 7 wherein each of said lead unit and said first and second remote units further comprise a redundant transmitting means, said first or second remote units toggling said redundant transmitting means on to transmit a respective first or second response message after receiving a predetermined number of retransmitted command messages.

9. An intra-train radio communication system according to claim 7 wherein each of said lead unit and said first and second remote units further comprise a redundant transmitting means, said lead unit transmitting a command message to one of said first or second remote units to toggle said redundant transmitting means on to transmit a respective first or second response message after retransmitting the command message for the predetermined number of times.

10. An intra-train radio communication system according to claim 7 wherein each of said lead unit and said first and second remote units further comprise a redundant transmitting means, said lead unit toggling the lead unit redundant transmitting means on when no response messages are received for either of said first and second remote units.

11. An intra-train radio communication system according to claim 7 wherein said lead unit further comprises means for outputting a communication loss warning signal if said predetermined number is exceeded.

12. An intra-train radio communication system according to claim 1 wherein said lead unit further comprises:
means for receiving said first response message and said second response message;
means for detecting if any of said first response message and said second response message are not received within a predetermined time period after a generation of a command message by said first transmitter means and for generating a request signal indicating which of said first and second response messages are not received; and
means for transmitting a response request message in accordance with said request signal.

13. An intra-train radio communication system according to claim 12 wherein at least one of said first and said second remote units further comprises:
means for receiving said response request message and said at least one of said first remote unit and said second remote unit comprises means for retransmitting at least one of said first response signal and said second response signal in accordance with said response request message.

14. An intra-train radio communication system according to claim 13 wherein at least one of said first remote unit and said second remote unit further comprises
means for receiving and storing one of said first remote response message and said second remote response message from the other of said first remote unit and said second remote unit; and
means for retrieving and transmitting said stored one of said first remote response message and said second remote response message in accordance with said response request message.

15. An intra-train radio communication system according to claim 1 wherein said first remote unit further comprises:
means for detecting a physical parameter representing a physical state of a locomotive associated with said first remote unit; and
means for transmitting an alarm message in response to said detected parameter.

16. An intra-train radio communication system according to claim 15 wherein said lead unit further comprises means for receiving said alarm message and for transmitting an alarm acknowledgment signal in response.

17. An intra-train radio communication system according to claim 16 wherein said first remote unit further comprises means for receiving said alarm acknowledgment signal and for generating a second alarm signal in response to detecting a failure to receive said acknowledgment signal within a predetermined time after transmitting said alarm message.

18. A method for communicating and verifying commands in an intra-train radio communication system comprising the steps of:
transmitting a command message from a lead unit installed in a first locomotive;
receiving the command message in a first remote unit installed in a second locomotive;
generating a first status message in the first remote unit in accordance with a content of the command message;
transmitting a first reply message from the first remote unit during a first predetermined time period, the reply message containing the first status message and a message representing said command message;

receiving said first reply message by a second remote unit installed in a third locomotive;

generating a second status message in the second remote unit in accordance with said message representing said command message;

transmitting a second reply message from the second remote unit during a second predetermined time period, said second reply message containing the second status message; and monitoring by the lead unit the first and second reply messages in the first and second predetermined time periods, respectively.

19. A method according to claim 18 further comprising the steps of:

detecting whether the first reply message and the second reply message are received by the lead unit;

transmitting a request message from the lead unit in accordance with a result from said detecting step;

receiving the request message in at least one of the first remote unit and second remote unit; and retransmitting from at least one of the first unit and second remote unit at least one of the first status message and second status message in accordance with the received request message.

20. A method according to claim 19 further comprising the step of receiving the second status message in the first remote unit, and wherein said retransmitting step retransmits said received second status message from the first remote unit in accordance with the receive request message.

21. An intra-train radio communication system comprising:

a plurality of communication modules, each communication module mounted in a respective one of a plurality of locomotives in a train consist and including a radio transmitter and receiver, a control module connected to and controlling the radio transmitter and receiver, a user interface connected to the control module for inputting data and commands by a user and outputting information to the user, and a hardware interface connected to the control module for receiving inputs from and outputting commands to a locomotive in which the communication module is mounted;

one of said communications modules being designated as a lead unit and others of the plurality of communications modules being designated as remote units, the lead unit and the remote units being linked by a Carrier Sense Multiple Access (CSMA) radio channel, the lead unit and the remote units storing a unique identifier for the lead unit, the lead unit further storing unique identifiers for each of the remote units, each of the remote units storing the unique identifier for the respective remote unit, and the lead and remote units storing an index indicating a position of the unit in the train consist;

radio communication between the lead unit and the remote units being effected by sending a message having a source field containing the unique identifier for the particular sending unit, a destination field in the form of a unique identifier for a particular one of the receiving units or a broadcast identifier common to all remote units, an index field indicating the position of the unit in the train consist, a command field specifying a command to be executed by one or more of the remote units, and a status field specifying a status of an originating remote unit;

when a remote unit receives a message from the lead unit, the remote unit compares contents of the source field against the stored unique identifier for the lead unit and compares contents of the destination field against the broadcast field and the unique identifier for the remote unit and, if the source field and the stored unique identifier for the lead unit match and the destination field matches either the broadcast identifier or the unique identifier for the remote unit, the receiving remote unit executes the command in the command field and transmits a status message during a predetermined time slot assigned to the lead unit in a Time Division Multiple Access (TDMA) scheme, the predetermined time slot being measured as a function of a difference in the remote unit's stored index and the index field of the received message, the status message including a rebroadcast of the transmission from the lead unit and any requested information in the status field;

but if only the source field and the stored unique identifier for the lead unit match, the remote unit transmits the status message to the lead unit without executing the command in the command field; and the lead unit monitors predetermined time slots for each of the remote units and detects a communication failure by a remote unit failing to reply with a status message during its predetermined time slot.

22. The intra-train radio communication system recited in claim 21 wherein if the lead unit fails to receive a status message from any the remote units after a predetermined period of time in response to a transmission from the lead unit, the lead unit transmits a status request to a remote unit failing to transmit a status message, and repeats the transmission of the status request for a predetermined number of times or until the remote unit transmits a status message in the predetermined time slot for the remote unit, whichever comes first, but if the predetermined number of times of transmission are reached without the remote unit transmitting a status message, then via the user interface of the communication module of the lead unit a loss of communication advisory is outputted.

23. The intra-train radio communication system recited in claim 22 further comprising an alternative communication link interconnecting the lead unit with each of the remote units, and wherein upon detecting a loss of communication by the lead unit with a remote unit, the lead unit communicates with the remote unit via the alternative communication link.

24. The intra-train radio communication system recited in claim 23 wherein the alternative communication link comprises a redundant receiver and transmitter in each communication module, both receivers of each communication module being on at all times while in operation but only one of the transmitters in each communication module being on at a time, a detection of a loss of communication by the lead unit with the remote unit causing the redundant transmitter to be toggled on and the other transmitter to be toggled off in the remote unit and the remote unit transmitting a status message to the lead unit via the redundant transmitter.

25. The intra-train radio communication system recited in claim 24 wherein upon receiving a predetermined number of status requests from the lead unit, the remote unit toggles the redundant transmitter of the remote unit on.

26. The intra-train radio communication system recited in claim 24 wherein upon transmitting a predetermined number of status requests by the lead unit without receiving a status message from the remote unit, the lead unit transmits a command to the remote unit to toggle on the redundant transmitter.

27. The intra-train radio communication system recited in claim 21 wherein the TDMA scheme includes multiple successive TDMA frames having predetermined time slots for each of the remote units and at least one of the remote units is designated as a repeater which, in addition to transmitting a status message in the time slot for the remote unit designated as a repeater in response to receiving a transmission from the lead unit, receives a status message from another remote unit and stores the received status message from the other remote unit according to the index field in the received status message.

28. The intra-train communication system recited in claim 27 wherein the designated repeater retransmits the received and stored status message from the other remote unit in response to the transmission from the lead unit in the time slot for the other remote unit in a successive TDMA frame.

29. The intra-train communication system recited in claim 27 wherein when the lead unit does not receive a status message from a remote unit, the lead unit transmits a command to the designated repeater to transmit any stored status message from the remote unit and the designated repeater retransmits any received and stored status message from the remote unit in the time slot for the remote unit in a successive TDMA frame.

30. The intra-train radio communication system recited in claim 27 wherein if the lead unit fails to receive a status message from any of the remote units after a predetermined period of time in response to a transmission from the lead unit, the lead unit transmits a status request to a remote unit failing to transmit a status message, and repeats the transmission of the status request for a predetermined number of times or until the remote unit transmits a status message in the predetermined time slot for the remote unit, whichever comes first, but if the predetermined number of times of transmission are reached without the remote unit transmitting a status message, then via the user interface of the communication module of the lead unit a loss of communication advisory is outputted.

31. The intra-train radio communication system recited in claim 30 further comprising an alternative communication link interconnecting the lead unit with each of the remote units, and wherein upon detecting a loss of communication by the lead unit with a remote unit, the lead unit communicates with the remote unit via the alternative communication link.

32. The intra-train radio communication system recited in claim 31 wherein the alternative communication link comprises a redundant receiver and transmitter in each communication module, both receivers of each communication module being on at all times while in operation but only one of the transmitters in each communication module being on at a time, a detection of a loss of communication by the lead unit with the remote unit causing the redundant transmitter to be toggled on and the other transmitter to be toggled off in the remote unit and the remote unit transmitting a status message to the lead unit via the redundant transmitter.

33. The intra-train radio communication system recited in claim 32 wherein upon receiving a predetermined number of status requests from the lead unit, the remote unit toggles the redundant transmitter of the remote unit on.

34. The intra-train radio communication system recited in claim 32 wherein upon transmitting a predetermined number of status requests by the lead unit without receiving a status message from the remote unit, the lead unit transmits a command to the remote unit to toggle on the redundant transmitter.

35. The intra-train radio communication system recited in claim 21 wherein the hardware interface includes a sensor at each of the remote units for detecting a condition, and wherein a remote unit, upon receiving a signal from the sensor of a detected condition, generates an advisory message, checks the CSMA channel to determine if the channel is clear for a predetermined delay period and transmits the advisory message to the lead unit.

36. The intra-train radio communication system recited in claim 35 wherein the detected condition is an emergency condition and the advisory message is an alarm and the lead unit, upon receiving an alarm message from the remote unit, acknowledges receipt of the alarm message by transmitting an acknowledgment message to the remote unit.

37. The intra-train radio communication system recited in claim 36 further comprising an alternative communication link interconnecting the lead unit with each of the remote units, and wherein if the remote unit fails to receive an acknowledgment message from the lead unit within a predetermined period of time after transmitting the alarm message to the lead unit, the remote unit retransmits the alarm message to the lead unit via the alternative communication link.

38. The intra-train radio communication system recited in claim 37 wherein the alternative communication link comprises a redundant receiver and transmitter in each communication module, both receivers of each communication module being on at all times while in operation but only one of the transmitters in each communication module being on at a time, the remote unit toggling the redundant transmitter of the remote unit on and retransmitting the alarm message via the redundant transmitter.

39. The intra-train radio communication system recited in claim 21 wherein the unique identifiers and the index fields for each of the communication modules are input via the user interface, the index field for each remote unit defining a predetermined time slot in the TDMA scheme, the lead unit initially transmitting a link request message to the remote units prior to transmitting command messages to the remote units and, in response to the link message from the lead unit, the remote units transmitting status messages as a link reply during the predetermined time slot assigned to the remote unit to confirm communication between the lead unit and each of the remote units.

40. A method of intra-train radio communication comprising the steps of:

installing a plurality of communication modules in respective ones of a plurality of locomotives in a train consist, each communication module including a radio transmitter and receiver, a control module connected to and controlling the radio transmitter and receiver, a user interface connected to the control module for inputting data and commands by a user and outputting information to the user, and a hardware interface connected to the control module for receiving inputs from and outputting commands to a locomotive in which the communication module is mounted;

designating one of said communications modules as a lead unit and others of the plurality of communications modules as remote units;

linking the lead unit and the remote units by a Carrier Sense Multiple Access (CSMA) radio channel;

storing in the lead unit and the remote units a unique identifier for the lead unit;

storing in the lead unit unique identifiers for each of the remote units;

storing in each of the remote units the unique identifier for the respective remote unit;

storing in the lead and remote units an index indicating a position of the unit in the train consist;

sending a message between the lead unit and the remote units, the message having a source field containing the unique identifier for the particular sending unit, a destination field in the form of a unique identifier for a particular one of the receiving units or a broadcast identifier common to all remote units, an index field indicating the position of the unit in the train consist, a command field specifying a command to be executed by one or more of the remote units, and a status field specifying a status of an originating remote unit;

receiving at a remote unit a message from the lead unit;

comparing by the remote unit contents of the source field in a received message from the lead unit against the stored unique identifier for the lead unit and comparing contents of the destination field against the broadcast field and the unique identifier for the remote unit;

if the source field and the stored unique identifier for the lead unit match and the destination field matches either the broadcast identifier or the unique identifier for the remote unit, executing by the receiving remote unit the command in the command field;

transmitting by the remote unit a status message to the lead unit, the status message including a rebroadcast of the transmission from the lead unit and an indication as to whether the command has been carded out and provides the lead unit with any requested information in the status field; the status message being transmitted in the predetermined time slot assigned to the lead unit in a Time Division Multiple Access (TDMA) scheme, the predetermined time slot being measured as a function of a difference in the remote unit's stored index and the index field of the received message;

but if only the source field and the stored unique identifier for the lead unit match, then transmitting by the remote unit the status message during the predetermined time slot without executing the command in the command field; and monitoring by the lead unit predetermined time slots for each of the remote units and detecting a communication failure by a remote unit failing to reply with a status message during its predetermined time slot.

* * * * *